US012780259B2

(12) United States Patent
Browning et al.

(10) Patent No.: US 12,780,259 B2
(45) Date of Patent: Nov. 3, 2026

(54) AUTONOMOUS VEHICLES WITH SEMI-AUTONOMOUS FOLLOWER MODE

(71) Applicant: Stack AV Co., Mount Pleasant, PA (US)

(72) Inventors: Brett Browning, Mount Pleasant, PA (US); Mark Ollis, Pittsburgh, PA (US); Albert Costa, Pittsburgh, PA (US); Dale Lord, Gibsonia, PA (US); Bryan Scott Salesky, Pittsburgh, PA (US); Peter William Rander, Mars, PA (US)

(73) Assignee: Stack AV Co., Mount Pleasant, PA (US)

( * ) Notice: Subject to any disclaimer, the term of this patent is extended or adjusted under 35 U.S.C. 154(b) by 245 days.

(21) Appl. No.: 18/647,474

(22) Filed: Apr. 26, 2024

(65) Prior Publication Data

US 2025/0333081 A1 Oct. 30, 2025

(51) Int. Cl.

*B60W 40/09* (2012.01)
*B60W 50/02* (2012.01)
*B60W 60/00* (2020.01)
*H04W 12/77* (2021.01)

(52) U.S. Cl.

CPC .. *B60W 60/00256* (2020.02); *B60W 50/0225* (2013.01); *H04W 12/77* (2021.01); *B60W 2420/403* (2013.01)

(58) Field of Classification Search

CPC ....... B60W 60/00256; B60W 50/0225; B60W 2420/403; H04W 12/77
See application file for complete search history.

(56) References Cited

U.S. PATENT DOCUMENTS

| | | | | |
|---|---|---|---|---|
| 9,278,689 | B1 * | 3/2016 | Delp | G08G 1/0965 |
| 11,964,671 | B2 * | 4/2024 | Bill | B60W 50/06 |
| 12,202,498 | B2 * | 1/2025 | Nemec | B60W 50/10 |
| 2010/0256852 | A1 * | 10/2010 | Mudalige | G08G 1/163 701/24 |
| 2016/0252905 | A1 * | 9/2016 | Tian | G06V 20/584 701/23 |
| 2021/0034060 | A1 * | 2/2021 | Patnaik | B60W 30/06 |

* cited by examiner

*Primary Examiner* — Masud Ahmed
(74) *Attorney, Agent, or Firm* — Morrison & Foerster LLP

(57) ABSTRACT

An exemplary vehicle comprises: one or more sensors; one or more processors; and one or more computer readable media storing instructions that, when executed by the one or more processors, cause the vehicle to: operate in an autonomous driving mode, wherein an operation in the autonomous driving mode comprises performing one or more driving operations based on road and environmental conditions detected by the one or more sensors; detect, by the one or more sensors, a first visual fiducial; and in response to detecting the first visual fiducial, operate in a semi-autonomous follower mode, wherein an operation in the semi-autonomous follower mode comprises performing one or more driving operations based on road and environmental conditions detected by the one or more sensors and one or more behaviors of a guide vehicle.

17 Claims, 5 Drawing Sheets

AUTONOMOUS VEHICLES WITH SEMI-AUTONOMOUS FOLLOWER MODE

FIELD

The present disclosure relates generally to autonomous vehicles and more specifically to autonomous vehicles capable of being operated in a semi-autonomous follower mode.

BACKGROUND

Autonomous trucking can be used to transport a shipment from an origin location (e.g., a production facility) to a delivery destination (e.g., a shipping facility or warehouse). In many cases, a shipping vehicle travels along one or more highways for the majority of a trip. However, once the shipping vehicle exits the highway, the vehicle may need to navigate surface streets such as city streets, residential streets, and/or access roads to reach its delivery destination.

SUMMARY

As explained above, autonomous trucks or other autonomous shipping vehicles may be used for autonomous transportation of goods, which may require navigating both on highways and on surface streets. Driving on surface streets involves several challenges not typically associated with highway driving. For example, surface streets may be narrower and more densely populated (e.g., with pedestrians, cyclists, or other drivers) than highways. Surface streets may also include features not typically seen on highways such as unprotected left turns, crosswalks, and train crossings. Additionally, surface streets may be more likely to be poorly marked, for example by having faint or missing lane-lines. Furthermore, the presence of construction zones or accident zones may necessitate changes in traffic patterns on surface streets. Some of these features can be challenging for autonomous vehicles to navigate. If an autonomous vehicle is unable to safely navigate these conditions, the autonomous vehicle may be unable to be deployed in situations involving surface street driving.

Existing solutions to this problem are costly and inefficient. For example, one solution involves constructing shipping facilities near highway exits to eliminate the need for autonomous vehicles to drive on surface streets to reach their delivery destinations. Relying on shipping facilities situated close to highway exits is expensive and time-consuming and introduces inherent limits on shipping flexibility. Other solutions use human drivers to take over the operation of autonomous vehicles during surface street portions of trips. For instance, one solution involves using semi-autonomous vehicles that can operate in an autonomous mode on the highway but that switch to a manual mode on surface streets, requiring the presence of a driver in the vehicle cab at all times. Another solution involves parking autonomous vehicles at transition stations located near highway exits, at which location human drivers can enter the parked vehicles. Once a human driver enters an autonomous vehicle, the human driver can manually drive the autonomous vehicle to its delivery destination. Thus, this solution also relies on human drivers, thereby increasing costs; this solution also decreases efficiency by requiring the shipping vehicle to stop so that the human driver can enter and take over the vehicle.

Thus, autonomous vehicles may be unable to safely navigate surface streets after exiting a highway, and existing solutions require costly infrastructure buildouts and/or expensive and inefficient reliance on human drivers. Accordingly, there is a need for improved systems, methods, and techniques for operation of autonomous and/or semi-autonomous vehicles driving on surface streets.

Described herein are systems and methods for semi-autonomous vehicle navigation in which autonomous vehicles may transition from a fully-autonomous mode usable for driving on highways to a semi-autonomous follower mode usable for driving on surface streets. The systems and methods described herein may address one or more of the above-identified needs.

In some embodiments, an autonomous vehicle operating in an autonomous mode (e.g., a fully autonomous mode) may control driving operations in a highway environment based on sensor feedback regarding the road, environmental conditions, and other road actors, as determined based on data detected by one or more sensors of the autonomous vehicle.

The vehicle may then transition into a semi-autonomous follower mode in which the vehicle may control driving operations based at least in part on following a manually-driven guide vehicle. The semi-autonomous follower mode may be used for navigation outside the highway environment, for example to navigate along one or more surface streets from a highway exit to a delivery destination (or from an origin location to a highway entrance).

In some embodiments, the autonomous vehicle may locate the guide vehicle using one or more optical sensors, for example one or more cameras and/or one or more TOF sensors (e.g., LIDAR sensors). In some embodiments, the autonomous vehicle may locate the guide vehicle using one or more visual fiducials (e.g., a QR code or other optical code) provided on the guide vehicle. The autonomous vehicle may detect, using the one or more sensors, the visual fiducial, and in response to detecting the visual fiducial, the autonomous vehicle may automatically transition to operate in the semi-autonomous follower mode. In semi-autonomous follower mode, the autonomous vehicle may perform one or more driving operations based on sensor data collected by the vehicle itself and based on one or more behaviors of the manually driven guide vehicle. Thus, in semi-autonomous follower mode, the autonomous vehicle may follow the manually driven vehicle along and through surface-street environments that may be difficult or impossible to navigate in fully autonomous mode.

The autonomous vehicles described herein provide several technical advantages. For example, because the autonomous vehicles described herein can operate on surface streets by following guide vehicles, no costly infrastructure investments (e.g., investments in new shipping facilities near highway exits or transition stations for picking up human drivers) are required, and more adaptive and dynamic logistical and shipping solutions may be implemented. Additionally, the autonomous vehicles described herein may operate on surface streets without stopping to pick up human drivers, thus improving the efficiency of autonomous trucking deliveries. Additionally, the techniques described herein regarding guide vehicle deployment, reliance on visual fiducials for pairing, navigation techniques in follower mode, and responses to failure conditions may improve efficiency, safety, and reliability of semi-autonomous vehicle operations. Furthermore, the autonomous vehicles described herein may be safely deployed on surface streets without being equipped with every capability that an autonomous vehicle would need to reach a delivery destination on its own, since a manually driven guide vehicle can guide the autonomous vehicle through unfamiliar situations. Therefore, the solution provided can be deployed while a full suite of autonomous vehicle capabilities is still in development.

In some embodiments, a vehicle comprises: one or more sensors; one or more processors; and one or more computer readable media storing instructions that, when executed by the one or more processors, cause the vehicle to: operate in an autonomous driving mode, wherein an operation in the autonomous driving mode comprises performing one or more driving operations based on road and environmental conditions detected by the one or more sensors; detect, by the one or more sensors, a first visual fiducial; and in response to detecting the first visual fiducial, operate in a semi-autonomous follower mode, wherein an operation in the semi-autonomous follower mode comprises performing one or more driving operations based on road and environmental conditions detected by the one or more sensors and one or more behaviors of a guide vehicle.

In some embodiments, the first visual fiducial is an ArUco, QR code, barcode, or bit code.

In some embodiments, the first visual fiducial is associated with the guide vehicle.

In some embodiments, the instructions, when executed by the one or more processors, cause the vehicle to: establish a communicative link with the guide vehicle based on the first visual fiducial.

In some embodiments, the communicative link is a peer-to-peer link.

In some embodiments, the communicative link is a cellular connection, a Bluetooth connection, or a direct wireless communication protocol.

In some embodiments, the one or more behaviors of the guide vehicle are detected by the one or more sensors.

In some embodiments, the one or more behaviors of the guide vehicle are obtained through the communicative link.

In some embodiments, the instructions, when executed by the one or more processors, cause the vehicle to: determine whether a failure condition has occurred; based on a determination that the failure condition has occurred, provide a first signal to a control system indicating that the failure condition has occurred; receive a second signal from the control system indicating a safe stop location; and responsively travel to the safe stop location in autonomous driving mode.

In some embodiments, the instructions, when executed by the one or more processors, cause the vehicle to: receive a third signal from the control system instructing the vehicle to wait for the guide vehicle to arrive at the safe stop location; after the guide vehicle arrives at the safe stop location, detect the first visual fiducial; and responsively resume operating in semi-autonomous follower mode.

In some embodiments, the instructions, when executed by the one or more processors, cause the vehicle to: receive a third signal from the control system instructing the vehicle to wait for a replacement guide vehicle to arrive at the safe stop location; after the replacement guide vehicle arrives at the safe stop location, detect a second visual fiducial; and responsively resume operating in semi-autonomous follower mode.

In some embodiments, the instructions, when executed by the one or more processors, cause the vehicle to: receive a third signal from the control system instructing the vehicle to wait for a human driver to arrive at the safe stop location; and after the human driver arrives at the safe stop location, operate in a manual mode, wherein an operation in the manual mode comprises one or more driving operations executed by the human driver.

In some embodiments, determining whether a failure condition has occurred comprises determining that the communicative link was lost and the one or more sensors do not detect the guide vehicle.

In some embodiments, determining whether a failure condition has occurred comprises determining that the guide vehicle made a maneuver that the vehicle cannot follow.

In some embodiments, determining whether a failure condition has occurred comprises determining that the guide vehicle was apprehended by law enforcement.

In some embodiments, determining whether a failure condition has occurred comprises determining that the guide vehicle was in a road accident.

In some embodiments, a method for controlling a vehicle is provided, the method performed at a vehicle comprising one or more sensors, one or more processors, and one or more computer readable media storing instructions, the method comprising: operating in an autonomous driving mode, wherein an operation in the autonomous driving mode comprises performing one or more driving operations based on road and environmental conditions detected by the one or more sensors; detecting, by the one or more sensors, a first visual fiducial; and in response to detecting the first visual fiducial, operating in a semi-autonomous follower mode, wherein an operation in the semi-autonomous follower mode comprises performing one or more driving operations based on road and environmental conditions detected by the one or more sensors and one or more behaviors of a guide vehicle.

In some embodiments, a non-transitory computer-readable storage medium storing instructions for controlling a vehicle comprising one or more sensors and one or more processors is provided, wherein the instructions, when executed by the one or more processors, cause the vehicle to: operate in an autonomous driving mode, wherein an operation in the autonomous driving mode comprises performing one or more driving operations based on road and environmental conditions detected by the one or more sensors; detect, by the one or more sensors, a first visual fiducial; and in response to detecting the first visual fiducial, operate in a semi-autonomous follower mode, wherein an operation in the semi-autonomous follower mode comprises performing one or more driving operations based on road and environmental conditions detected by the one or more sensors and one or more behaviors of a guide vehicle.

In some embodiments, any of the features of any of the embodiments described above and/or described elsewhere herein may be combined, in whole or in part, with one another.

Additional advantages will be readily apparent to those skilled in the art from the following detailed description. The aspects and descriptions herein are to be regarded as illustrative in nature and not restrictive.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1:
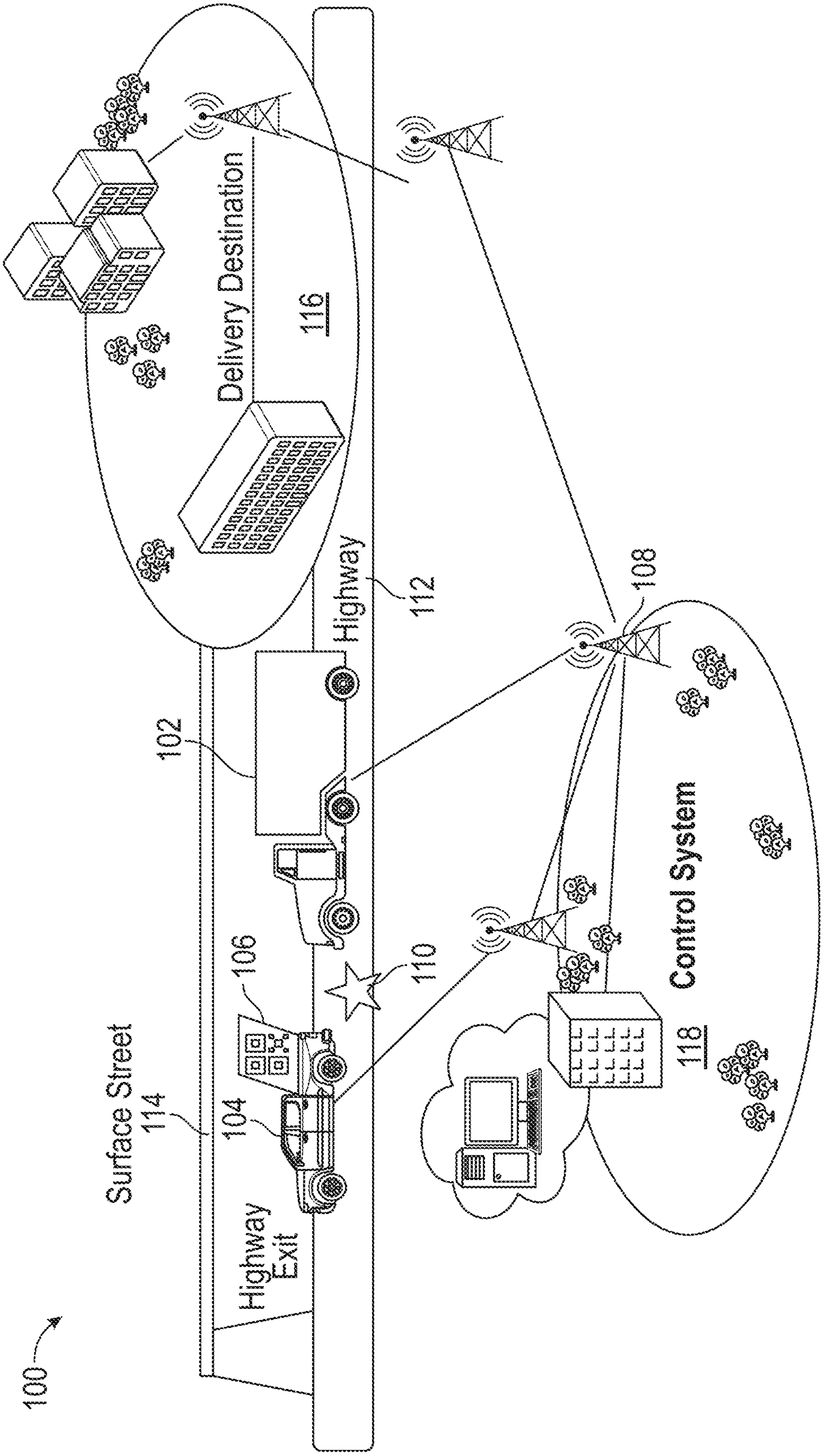
FIG. 1 illustrates an exemplary system for operating an autonomous vehicle with semi-autonomous follower mode, according to some embodiments.

As described, navigating surface streets can be challenging for autonomous vehicles. When driving on surface streets, autonomous vehicles may be unable to safely navigate narrow roads, densely populated areas, construction zones, accident zones, poorly marked streets, or other features that are more likely to occur commonly on surface streets than on highways.

Accordingly, provided herein are autonomous vehicles capable of automatically transitioning from a fully autonomous mode for highway driving into a semi-autonomous follower mode for surface street driving. The described autonomous vehicles can be safely operated on surface streets by following a manually driven guide vehicle in semi-autonomous follower mode. An exemplary autonomous vehicle can include one or more sensors, one or more processors, and one or more computer readable media storing instructions executable by the one or more processors to cause the vehicle to perform the various functionalities described herein, including operation in different driving modes and transitioning between said different driving modes.

The vehicle may operate in an autonomous driving mode, wherein an operation in the autonomous driving mode comprises performing one or more driving operations based on sensor data collected by the vehicle, wherein the sensor data provides information about the road, environmental conditions, and other actors surrounding the vehicle.

The vehicle may then transition into a semi-autonomous follower mode. Transitioning into a semi-autonomous follower mode may in some embodiments be triggered by a user input, an environmental trigger as detected by one or more sensors, an instruction received by wireless communication, and/or by detection of a guide vehicle.

In some embodiments, the autonomous vehicle may detect a guide vehicle by detecting, using one or more sensors of the autonomous vehicle, a visual fiducial provided on the guide vehicle. The visual fiducial may be, for example, a QR code or other optical code painted onto, displayed on a placard, or displayed on a dynamic display on the guide vehicle. The visual fiducial may be detected by an optical sensor (e.g., a camera) mounted on the autonomous vehicle (which may or may not be used for detection of the road environment for navigation in autonomous mode).

In response to detecting the visual fiducial, the autonomous vehicle may automatically transition from autonomous mode to semi-autonomous follower mode. While in semi-autonomous follower mode, the autonomous vehicle may perform one or more driving operations based on sensor data regarding the road, environment, and surrounding actors, and based on one or more behaviors of a guide vehicle. While in semi-autonomous follower mode, the autonomous vehicle may be automatically controlled so as to follow a position and/or mimic a route of the guide vehicle, where the position and/or route of the guide vehicle may be determined based on sensors (e.g., optical detection) by the autonomous vehicle and/or may be determined based on data wirelessly transmitted to the autonomous vehicle.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed terms. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, storage medium, such as, but not limited to, any type of disk, including floppy disks, USB flash drives, external hard drives, optical disks, CD-ROMs, magneto-optical disks, read-only memories (ROMs), random access memories (RAMs), EPROMs, EEPROMs, magnetic or optical cards, application-specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear in the description below. In addition, the present invention is not described with reference to any particular programming language. It will be appreciated that a variety of programming languages may be used to implement the teachings of the present disclosure as described herein.

FIG. 1 illustrates an exemplary system 100 for operating an autonomous vehicle with semi-autonomous follower mode, according to some embodiments. The system 100 may include an autonomous vehicle 102 that is capable of selectively operating in an autonomous (e.g., highway driving) mode and a separate semi-autonomous follower mode (e.g., for surface street driving). The system 100 may further include a guide vehicle 104. Guide vehicle 104 may include a visual fiducial 106. Autonomous vehicle 102 may detect visual fiducial 106 at a predetermined rendezvous point 110 and responsively pair with guide vehicle 104. In some embodiments, autonomous vehicle 102 and guide vehicle 104 may additionally establish a communicative link with one another and/or with one or more additional components of system 100 via network 108.

In some embodiments, autonomous vehicle 102 may pair with guide vehicle 104. As used herein, pairing with guide vehicle 104 may refer to autonomous vehicle 102 entering a follower operation mode in which navigation operations are performed to follow guide vehicle 104. As used herein, pairing with guide vehicle 104 may refer to autonomous vehicle 104 and/or guide vehicle 102 being electronically registered to operate in follower mode with one another, and/or completing an electronic wireless handshake with one another, and/or establishing an electronic communicative link with one another (either directly or through one or more intermediate network components such as satellites and/or servers).

After entering follower mode, autonomous vehicle 102 may detect (e.g., via sensor data and/or via wirelessly communicated data) one or more behaviors of guide vehicle 104, and autonomous vehicle may control its own driving operations in order to follow guide vehicle 104. Autonomous vehicle 102 may follow guide vehicle 104 from rendezvous point 110 along a highway 112 onto one or more surface streets 114 and ultimately to a destination 116.

The system 100 may further include a control system 118, which may comprise one or more processors (e.g., provided as part of a remote computer and/or remote server) configured to execute code for planning one or more aspects of an autonomous vehicle trip, for receiving data from and providing instructions and/or control signals to autonomous vehicle 102 and guide vehicle 104, for monitoring the positions of autonomous vehicle 102 and guide vehicle 104, and/or for instructing autonomous vehicle 102 regarding whether, when, and how to enter into follower mode for example with a specific designated guide vehicle.

In some embodiments, autonomous vehicle 102 may be a truck or car capable of operating in either an autonomous driving mode or in a separate semi-autonomous follower mode. In some embodiments, autonomous vehicle 102 may be a truck used to deliver cargo (e.g., consumer goods, equipment, commodities, livestock, etc.) to a destination 116. Autonomous vehicle 102 may include one or more sensors (e.g., one or more optical sensors, cameras, LIDAR sensors, and/or other sensors usable for detecting information about surrounding roads, environments, and actors), one or more communication devices configured for electronic wireless communication with one or more other components of system 100, one or more processors, and one or more computer readable media storing instructions to be executed by the one or more processors.

The one or more sensors of autonomous vehicle 102 may include an optical sensor configured to detect a visual fiducial 106 associated with guide vehicle 104 and/or configured to detect road, environmental, and other actor conditions in autonomous driving mode or semi-autonomous follower mode. In some embodiments, the one or more sensors may include a LIDAR sensor for detecting road, environmental, and/or actor conditions in autonomous driving mode or semi-autonomous follower mode. Autonomous vehicle 102 can include one or more communication devices configured for electronic wireless communication with one or more other components of system 100, for example via cellular communication, WiFi communication, Bluetooth communication, and/or any other suitable electronic communication protocol. Autonomous vehicle 102 can also include one or more processors. The one or more processors may include one or more processing units (e.g., digital circuitry, microcontrollers, microprocessors, embedded processors, central processing units (CPUs), graphics processing units (GPUs), etc.). Autonomous vehicle 102 may further include one or more computer readable media storing instructions for performing various operations (e.g., operating in autonomous driving mode, detecting visual fiducial 106, and responsively operating in semi-autonomous follower mode). The computer readable media can be any medium (e.g., a memory) that can store programs to be executed by the one or more processors of autonomous vehicle 102.

Autonomous vehicle 102 can operate it an autonomous driving mode. When autonomous vehicle 102 is operated in autonomous driving mode, the driving operations performed by autonomous vehicle 102 are based on the road, environmental, and/or actor conditions detected by the one or more sensors. The one or more processors of autonomous vehicle 102 can be configured to apply one or more autonomous driving programs stored in a memory of the autonomous vehicle to the detected road and environmental conditions to execute specific driving operations. Driving operations performed in autonomous driving mode may include, but are not limited to, driving at an indicated speed limit, following traffic light signals, stopping at stop signs, driving conservatively on sparsely populated surface streets to avoid collisions, and/or driving through automatic toll booths.

In some embodiments, autonomous vehicle 102 may encounter a situation in which system 102 determines that one or more driving operations cannot or should not safely be executed in autonomous driving mode. In such cases, autonomous vehicle 102 may operate it a semi-autonomous follower mode. Alternatively or additionally, autonomous vehicle 102 may receive an explicit instruction to cease operating in autonomous driving mode and to instead operate in semi-autonomous follower mode.

In semi-autonomous follower mode, autonomous vehicle 102 may perform one or more driving operations based on a combination of the road/environmental/actor conditions detected by the one or more sensors and one or more behaviors of a guide vehicle 104 which autonomous vehicle 102 will seek to follow and/or mimic. The one or more processors of autonomous vehicle 102 can be configured to apply one or more semi-autonomous driving programs stored in the memory of the autonomous vehicle to the detected road/environmental/actor conditions and the detected guide vehicle behaviors to execute specific driving operations. Driving operations performed in semi-autonomous follower mode may include, but are not limited to, navigating construction zones on surface streets, navigating densely populated surface streets, navigating accident zones, driving through manual toll booths, and driving through difficult weather conditions such as snow, heavy dust, or heavy rain. In some embodiments, as the autonomy capabilities of autonomous vehicle 102 are updated, autonomous vehicle 102 may become capable of performing one or more driving operations currently performed in semi-autonomous follower mode in autonomous driving mode.

While autonomous vehicle 102 is operated in semi-autonomous follower mode, the one or more processors of autonomous vehicle 102 may continue to execute one or more autonomous driving programs that would be executed regardless of whether autonomous vehicle 102 was following guide vehicle 104. Doing so may enable the autonomous vehicle to avoid collisions, comply with traffic laws, and/or comply with safety norms regardless of the behavior of guide vehicle 104. For example, if autonomous vehicle 102 is being operated in semi-autonomous follower mode and guide vehicle 104 drives through an intersection with a traffic signal that turns red before autonomous vehicle 102 reaches the intersection, autonomous vehicle 102 may apply an autonomous driving control operation to stop at the traffic signal regardless of the behavior of guide vehicle 104, rather than following guide vehicle 104 through the red light. In some embodiments, the autonomous decision making of autonomous vehicle 102 may be overridden when autonomous vehicle 102 is operated in semi-autonomous follower mode. For instance, if guide vehicle 104 briefly merges onto the wrong side of the road in order to avoid hitting a pedestrian, standard autonomy controls of autonomous vehicle 102 might dictate that autonomous vehicle 102 should ignore the ostensibly unsafe behavior of guide vehicle 104 and should stay on the correct side of the road; however, the standard autonomy controls may in this situation be overridden, and autonomous vehicle 102 may follow guide vehicle 104 onto the wrong side of the road in order to avoid hitting the pedestrian. In some embodiments, the override may be performed by a driver of guide vehicle 104 and/or by control system 118. In the event of conflicting instructions from the driver of guide vehicle 104, control system 118, the standard autonomy controls of autonomous vehicle 102, and/or the semi-autonomous follower mode decision making controls of autonomous vehicle 102, the order of precedence shall be: (highest) following instructions from the driver of guide vehicle 104, (next highest) following instructions from control system 118, (next highest) following the standard autonomy controls of autonomous vehicle 102, (lowest) following guide vehicle 104 in semi-autonomous follower mode.

System 100 may further include guide vehicle 104. Guide vehicle 104 may be a car or truck operated by a human driver. The human driver may be trained to operate guide vehicle 104 in a manner that is conducive to following by autonomous vehicle 102 (e.g., in a manner that maximizes the ability of autonomous vehicle 102 to follow guide vehicle 104 while ensuring that both vehicles follow applicable traffic laws and safety regulations).

In some embodiments, guide vehicle 104 may include a user interface for displaying information to the human driver. For instance, the user interface may display information about the trip (e.g., a planned driving route, an estimated time of arrival, an identifier for autonomous vehicle 102, etc.), the connectivity status of guide vehicle 104 to autonomous vehicle 102, the connectivity status of guide vehicle 104 to control system 118, a real-time map view of the locations of guide vehicle 104 and/or autonomous vehicle 102, and/or an indication of known challenges along the planned driving route. In some embodiments, the information displayed on the user interface may be received from control system 118.

Guide vehicle 104 may include a visual fiducial 106 that may be detected by one or more sensors of autonomous vehicle 102. In some embodiments, visual fiducial 106 may be a QR code, ArUco, barcode, bit code, or other optical code or visual fiducial. Visual fiducial 106 may be attached to the exterior or interior of guide vehicle 104 such that visual fiducial 106 is visible by the one or more sensors of autonomous vehicle 102. In some embodiments, visual fiducial 106 may be provided on a fixed display mounted to guide vehicle 104, may be painted onto guide vehicle 104, and/or may be rendered on a dynamic display mounted to guide vehicle 104.

Visual fiducial 106 may be used to identify guide vehicle 104 to one or more optical sensors of autonomous vehicle 102. To pair autonomous vehicle 102 and guide vehicle 104, autonomous vehicle 102 may detect the visual fiducial on guide vehicle 104 and may then pair with guide vehicle 104. Visual fiducial 106 may additionally or alternatively be used to aid autonomous vehicle 102 in visually tracking guide vehicle 104 before and/or after pairing, and/or during operation in semi-autonomous follower mode.

In some embodiments, when the one or more sensors of autonomous vehicle 102 detect visual fiducial 106, autonomous vehicle 102 may automatically responsively pair with guide vehicle 104 and operate in semi-autonomous follower mode. In some embodiments, detecting visual fiducial 106 may cause autonomous vehicle 102 to automatically establish a connection with guide vehicle 104 (e.g., a cellular connection, a Bluetooth connection, or another wireless communication protocol) if such a connection is not already established. In some embodiments, autonomous vehicle 102 may have received instructions (e.g., from control system 118) to pair and/or follow a specific guide vehicle, and autonomous vehicle 102 may then use visual fiducial 106 to identify the specific guide vehicle 104 that is has been instructed to follow. Thus, visual fiducial 106 may allow autonomous vehicle 102 to reliably distinguish between multiple guide vehicles, in order to identify, pair with, track, and follow the intended guide vehicle.

In some embodiments, autonomous vehicle 102 may continue to operate in semi-autonomous follower mode as long as the one or more sensors detect visual fiducial 106, and may and may automatically revert to autonomous mode if the visual fiducial can no longer be optically detected.

In some embodiments, detecting visual fiducial 106 may cause autonomous vehicle 102 to automatically establish one or more wireless communicative links with guide vehicle 104. The one or more wireless communicative links may be established via network 108. Network 108 may be a peer-to-peer network, mesh network, satellite communications network, or any other suitable wireless network communication arrangement. The one or more wireless communicative links may include a cellular connection, a Bluetooth connection, or one or more other wireless communication protocols. In some embodiments, multiple (e.g., redundant) wireless communicative links may be simultaneously established between autonomous vehicle 102 and guide vehicle 104. For instance, autonomous vehicle 102 and guide vehicle 104 may be linked via a cellular connection and a Bluetooth connection simultaneously.

System 100 may further include a rendezvous point 110. Rendezvous point 110 is a predetermined (or, in some instances, dynamically determined) location at which autonomous vehicle 102 and guide vehicle 104 are instructed by control system 118 to meet with one another for pairing and subsequent operation in follower mode. In some embodiments, rendezvous point 110 is a predetermined location on a highway 112 on which autonomous vehicle 102 is traveling. Alternatively, rendezvous point 110 may be a depot or loading dock from which autonomous vehicle 102 needs to be guided to a highway 112. In some embodiments, rendezvous point 110 may be a location on a surface street 114 at which autonomous vehicle 102 is stranded on its way to a depot or to highway 112. Control system 118 may transmit information to autonomous vehicle 102 and guide vehicle 104 specifying the geographic location of rendezvous point 110, along with instructions regarding how to navigate to rendezvous point and when and how to pair with the other vehicle for operation in follower mode.

Figure 2:
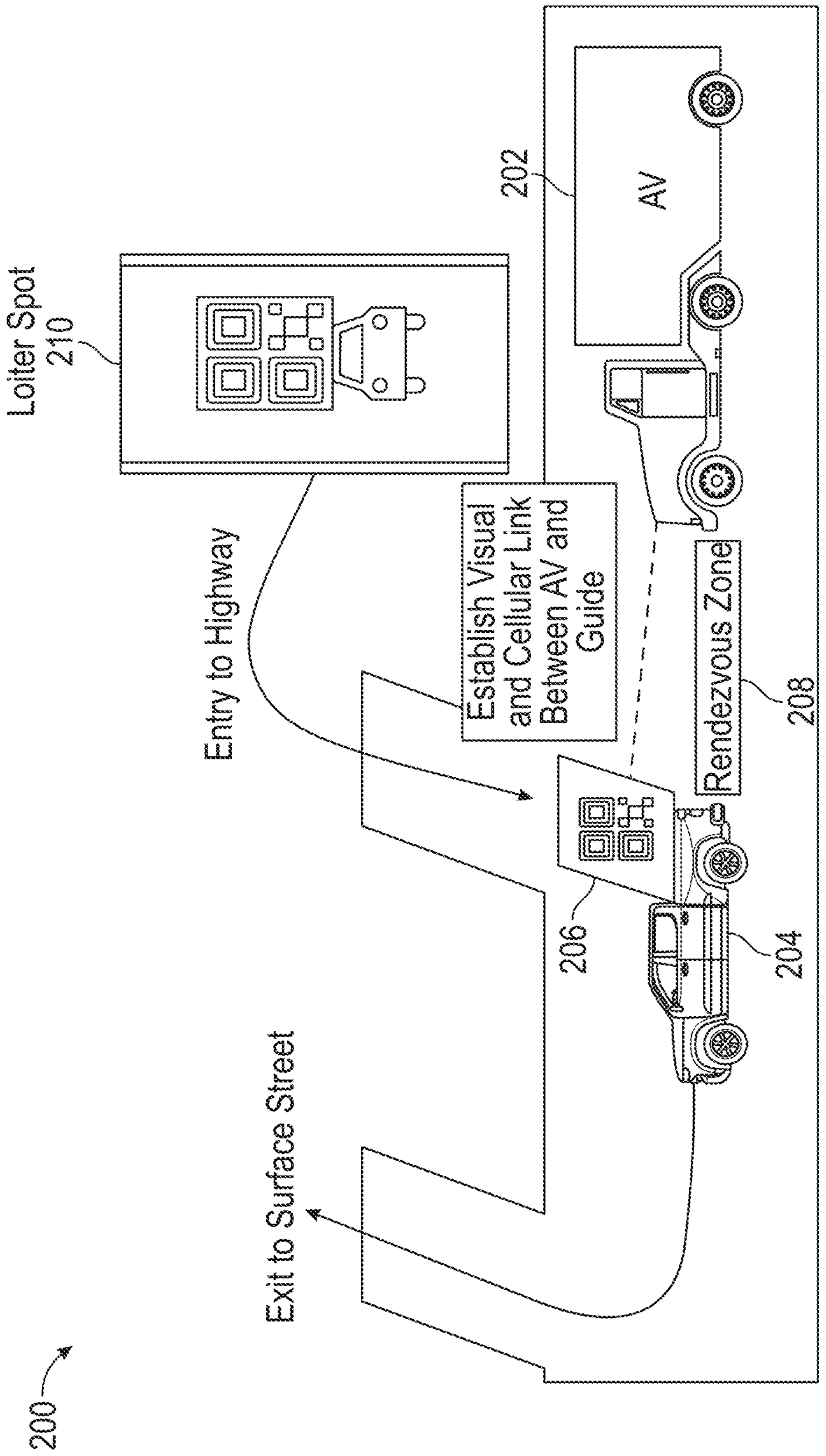
FIG. 2 illustrates an exemplary system for pairing an autonomous vehicle with semi-autonomous follower mode and a guide vehicle, according to some embodiments.

In some embodiments, guide vehicle 104 receives an indication from a control system 118 to rendezvous with autonomous vehicle 102 at rendezvous point 110 at a specified time. The location of rendezvous point 110 and the specified rendezvous time may be indicated to a human driver of guide vehicle 104 via a user interface in guide vehicle 104. The location of rendezvous point 110 may also be indicated to autonomous vehicle 102 by control system 118. Autonomous vehicle 102 may anticipate pairing with guide vehicle 104 as it approaches rendezvous point 110 and seek to establish one or more communicative links with guide vehicle 104 upon reaching rendezvous point 110. In some embodiments, control system 118 may dispatch guide vehicle 104 directly to rendezvous point 110. In some embodiments, control system 118 may dispatch guide vehicle 104 to a predetermined loiter spot near rendezvous point 110 to wait for autonomous vehicle 102 to approach rendezvous point 110 before entering highway 112 and navigating to rendezvous point 110, as shown in FIG. 2.

In some embodiments, autonomous vehicle 102 may not be able to detect and pair with guide vehicle 104 at rendezvous point 110. For example, autonomous vehicle 102 may be unable to detect guide vehicle 104 at the rendezvous point, guide vehicle 104 may arrive late to the rendezvous point, or autonomous vehicle 102 may arrive early to the rendezvous point. If autonomous vehicle 102 is unable to pair with guide vehicle 104 at rendezvous point 110, autonomous vehicle 102 may travel to a predetermined backup pairing location. The backup pairing location may be a side of the highway, a highway exit, a surface street, a parking lot, a rest area, or any other suitable place for autonomous vehicle 102 to stop. The backup pairing location may be determined by and instructed by control system 118. In some embodiments, the backup pairing location may be indicated to autonomous vehicle 102 by control system 118. Once autonomous vehicle 102 reaches the backup pairing location, autonomous vehicle 102 can receive further guidance from control system 118 or wait for guide vehicle 104 to arrive in order to retry pairing.

Once autonomous vehicle 102 and guide vehicle 104 have paired at rendezvous point 110 (or at a backup pairing location in the case of a pairing failure), autonomous vehicle 102 may operate in semi-autonomous follower mode and follow guide vehicle 104 along highway 112 to an exit to one or more surface streets 114. Surface street(s) 114 may include non-highway roads that are difficult for autonomous vehicle 102 to navigate in autonomous driving mode, such as city streets, residential streets, or access roads. Surface street(s) 114 may be challenging for autonomous vehicle 102 to navigate due to the presence of pedestrians, crosswalks, train crossings, construction zones, lane closures, accident zones, manual toll booths, adverse weather conditions (e.g., heavy rain, wind, snow, or dust), or any combination thereof.

Surface street(s) 114 may lead to destination 116. Destination 116 may be a drop-off location for cargo (e.g., consumer goods, equipment, commodities, livestock, etc.) transported by autonomous vehicle 102. Destination 116 may be a warehouse, a shipping facility, a store, or any other suitable destination for cargo transported by autonomous vehicle 102. In some embodiments, guide vehicle 104 may guide autonomous vehicle 102 to destination 116.

In some embodiments, control system 118 may have access to information regarding each trip taken by a fleet of autonomous vehicles. For instance, control system 118 may include information such as the origin, destination, route, rendezvous point, pre-determined loiter spots, pre-determined backup pairing locations, pre-determined safe stop locations, and assigned guide vehicle for each autonomous vehicle trip. In some embodiments, the route, rendezvous point, pre-determined loiter spots, pre-determined backup pairing locations, pre-determined safe stop locations, and assigned guide vehicle for each autonomous vehicle trip are determined dynamically (e.g., based on user inputs and/or data received from other systems) by control system 118.

Control system 118 may be communicatively connected to autonomous vehicle 102 and guide vehicle 104 via a network such as network 108. Control system 118 can monitor real-time conditions for each autonomous vehicle trip via the network connection. For instance, for each autonomous vehicle trip, control system 118 can monitor the positions of autonomous vehicle 102 and guide vehicle 104. Control system 118 can also monitor the status of each vehicle. For example, control system 118 can monitor whether a given autonomous vehicle has successfully paired with a respective guide vehicle or whether a given autonomous vehicle or guide vehicle is in distress (e.g., involved in an accident, apprehended by law enforcement, stranded due to a vehicle failure or poor weather conditions, etc.).

Control system 118 may transmit information and/or control signals to autonomous vehicle 102 and/or guide vehicle 104. For instance, control system 118 may provide an instruction to autonomous vehicle 102 to rendezvous with guide vehicle 104 at a specified rendezvous point 110 and rendezvous time window. Similarly, control system 118 may provide various instructions to a human driver of guide vehicle 104 via a user interface of guide vehicle 104, such as information about the trip (e.g., a destination, a planned driving route, an identifier for autonomous vehicle 102, a loiter point, a rendezvous point, a rendezvous time estimate), the connectivity status of guide vehicle 104 to autonomous vehicle 102, the connectivity status of guide vehicle 104 to control system 118, a real-time map view of the locations of guide vehicle 104 and/or autonomous vehicle 102, or an indication of known challenges along the planned driving route.

Control system 118 may receive transmission of information from autonomous vehicle 102 and/or guide vehicle 104. For example, control system 118 may receive a signal from autonomous vehicle 102 if guide vehicle 104 experiences a failure condition (e.g., if guide vehicle 104 is involved in an accident, apprehended by law enforcement, or stranded due to a vehicle failure). In another example, control system 118 may receive a signal from guide vehicle 104 if guide vehicle 104 is unable to pair with autonomous vehicle 102 at a specified rendezvous location 110 and/or within a specified rendezvous time window.

In some embodiments, control system 118 may provide a user interface usable by a "back-end" management user, e.g., a user who is not a driver of any of the guide vehicles. The user interface can display on a display, for one or more autonomous vehicle trips managed and/or monitored by control system 118, the positions of autonomous vehicles and/or guide vehicles. In some embodiments, the user interface may display the positions of all autonomous vehicles and all guide vehicles in a fleet of autonomous vehicles and guide vehicles. The user interface may also be configured to display information about each ongoing trip in the fleet of autonomous vehicles and guide vehicles. For instance, the user interface can display routes, rendezvous points, predetermined loiter spots, pre-determined backup pairing locations, pre-determined safe stop locations, estimated times of arrival, or a combination thereof. In some embodiments, the user interface may also include an indication of whether any of the autonomous vehicles or guide vehicles are in distress (e.g., involved in an accident, apprehended by law enforcement, stranded due to a vehicle failure or poor weather conditions, etc.). In some embodiments, the user interface may include menu options (e.g., checkboxes or toggle switches) to display or hide each of the preceding pieces of information or to switch between multiple screens displaying subsets of the preceding information.

FIG. 2 illustrates an exemplary system 200 for pairing an autonomous vehicle with semi-autonomous follower mode and a guide vehicle, according to some embodiments. The system 200 includes an autonomous vehicle 202 capable of being operated in autonomous driving mode or semi-autonomous follower mode. The system 200 may further include guide vehicle 204, which may include a visual fiducial 206. As described above with reference to FIG. 1, autonomous vehicle 202 may detect visual fiducial 206 at a predetermined rendezvous point 208 and responsively operate in semi-autonomous follower mode in which autonomous vehicle 202 follows one or more behaviors of guide vehicle 204. Before autonomous vehicle 202 reaches the rendezvous point 208, guide vehicle 204 may wait at a loiter spot 210.

System 200 includes an autonomous vehicle 202 capable of being operated in autonomous driving mode or semi-autonomous follower mode. Autonomous vehicle 202 may share any one or more characteristics with autonomous vehicle 102 as described above with reference to FIG. 1.

System 200 also includes a guide vehicle 204. Guide vehicle 204 may be a car or truck operated by a human driver that can lead autonomous vehicle 202 when autonomous vehicle 202 is operated in semi-autonomous follower mode. Guide vehicle 204 may share any one or more characteristics with guide vehicle 104 as described above with reference to FIG. 1.

Guide vehicle 204 may include a visual fiducial 206, such as an ArUco, QR code, barcode, bit code, or other unique visual fiducial. Autonomous vehicle 202 may detect visual fiducial 206 and responsively operate in semi-autonomous follower mode in which autonomous vehicle 202 detects and follows one or more behaviors of guide vehicle 204. Visual fiducial 206 may share any one or more characteristics with visual fiducial 106 as described above with reference to FIG. 1.

System 200 also includes a rendezvous point 208 at which autonomous vehicle 202 and guide vehicle 204 can meet. At rendezvous point 208, autonomous vehicle 202 may detect visual fiducial 206 and pair with guide vehicle 204. Rendezvous point 208 may share any one or more characteristics with rendezvous point 110 as described above with reference to FIG. 1.

System 200 may also include a loiter spot 210. Loiter spot 210 may be a predetermined or dynamically determined location near rendezvous point 208 at which guide vehicle 204 may wait until autonomous vehicle 202 is close to rendezvous point 208. Loiter spot 210 may be a surface street, a parking lot, a rest area, or any other suitable location for guide vehicle 204 to loiter while waiting for autonomous vehicle 202 to approach rendezvous point 208. In some embodiments, loiter spot 210 is near an entrance to a highway on which autonomous vehicle 202 is traveling and on which rendezvous point 208 is located. In some embodiments, a suitable loiter spot 210 may be indicated to a human driver of guide vehicle 204 by a control system, such as control system 118 as described above with reference to FIG. 1. When autonomous vehicle 202 is near (e.g., within a predetermined distance of) rendezvous point 208, guide vehicle 204 may leave loiter spot 210 and travel to rendezvous point 208 to anticipate pairing.

In some embodiments, a location of loiter spot 210 and/or a time window for guide vehicle 206 to wait in loiter spot 210 may be dynamically determined by control system 118, for example based on shipping routes, computed navigation routes, and/or traffic conditions.

In some embodiments, instead of or in addition to a loiter spot in which guide vehicle 204 waits in a stationary manner, system 200 may determine and/or implement a moving loiter route, for example by which guide vehicle 204 circles a block or circles on a short loop route during a loiter stage before entering the highway to rendezvous with the autonomous vehicle 202.

Figure 3A:
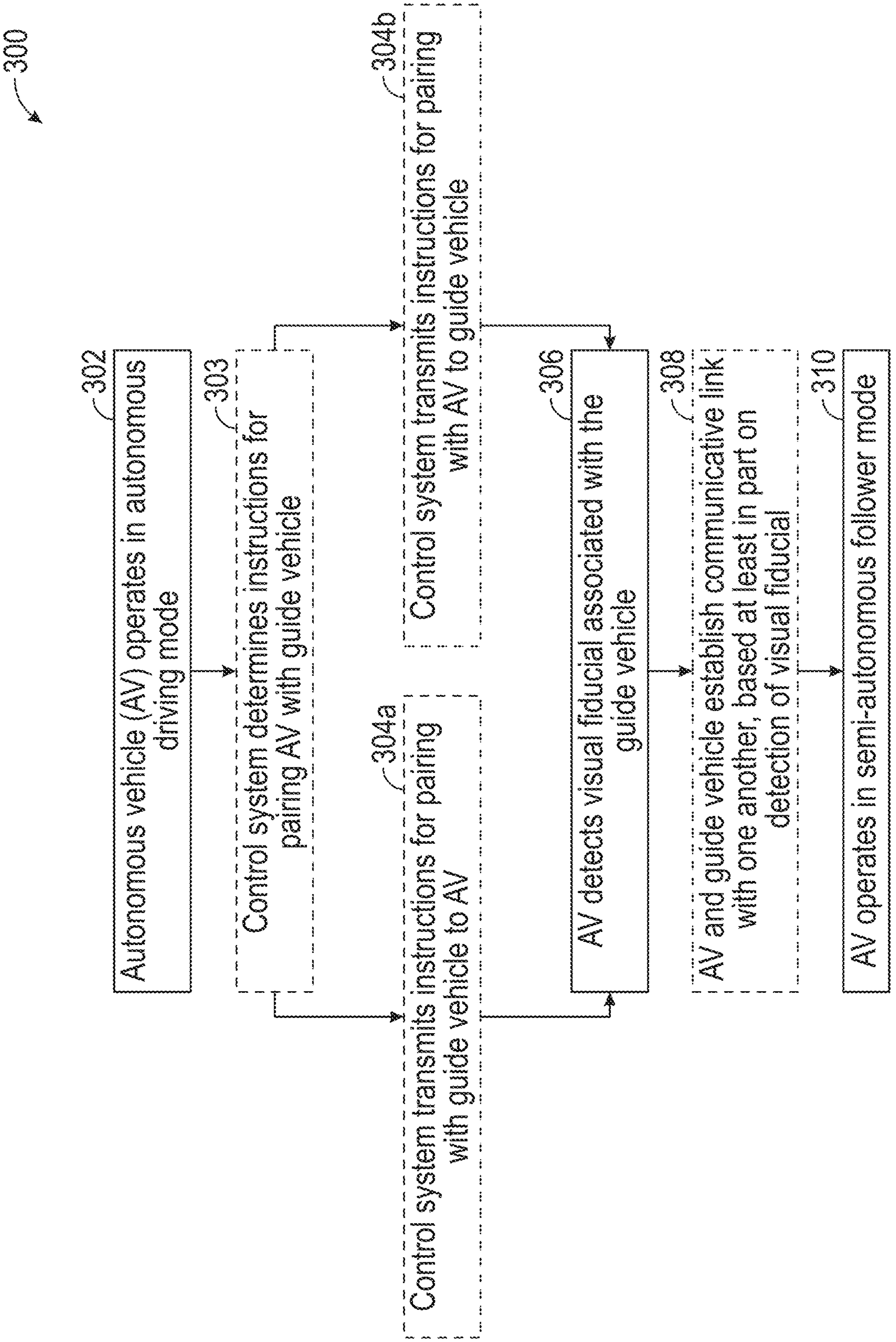
FIGS. 3A and 3B illustrate an exemplary method for operating an autonomous vehicle with semi-autonomous follower mode, according to some embodiments.
Figure 3B:
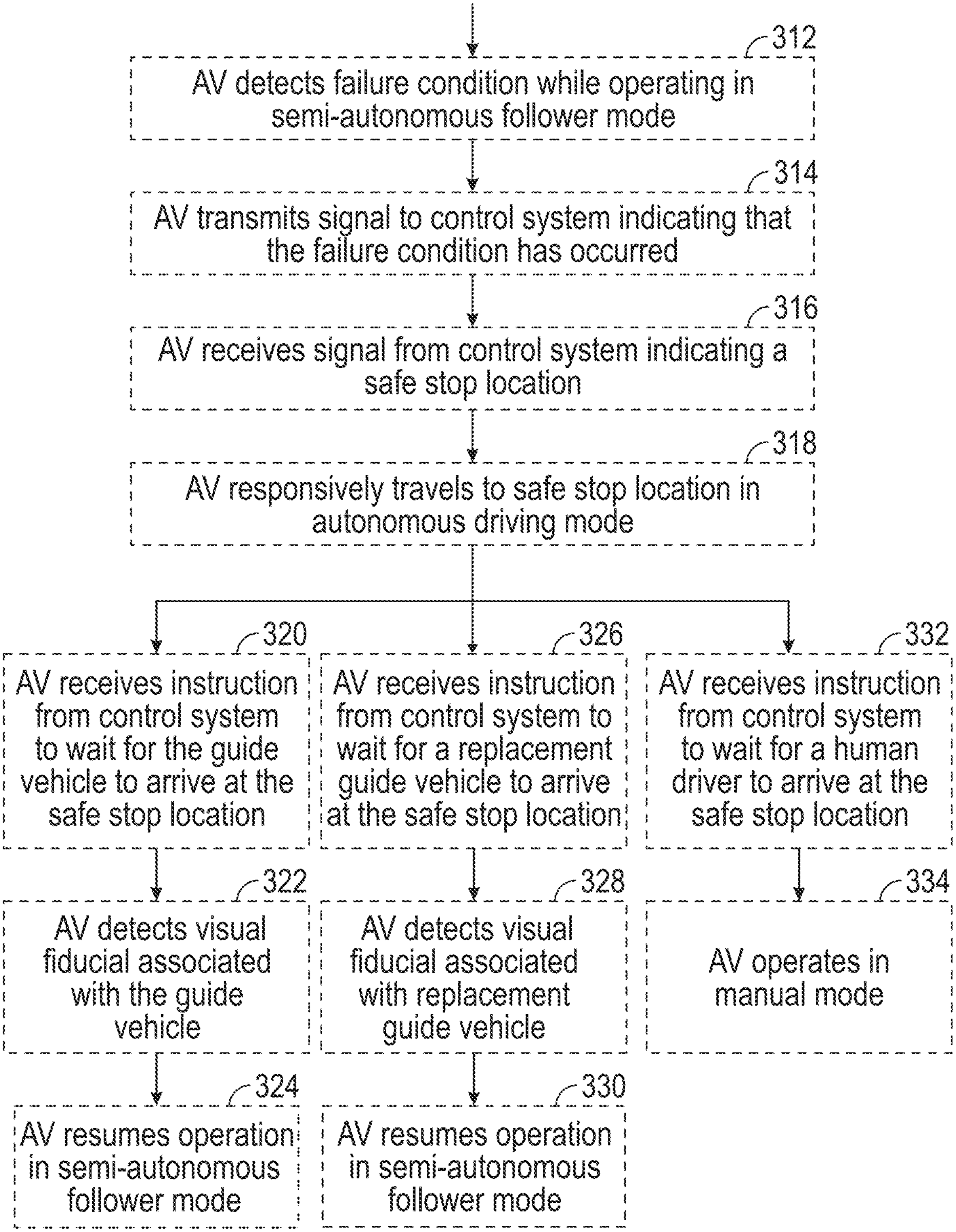

FIGS. 3A and 3B illustrate an exemplary method 300 for operating an autonomous vehicle with semi-autonomous follower mode, according to some embodiments. In some embodiments, some steps of the method 300 are, optionally, combined; the order of some steps is, optionally, changed; and some steps are, optionally, omitted. In some embodiments, additional steps may be performed in combination with the method 300. Accordingly, the operations as illustrated (and described in greater detail below) are exemplary by nature and, as such, should not be viewed as limiting.

The method 300 may begin at step 302. In step 302, an autonomous vehicle operates in autonomous driving mode. An operation in autonomous driving mode may comprise performing one or more driving operations based on road, environmental, and/or actor conditions detected by the one or more sensors of the autonomous vehicle. The one or more sensors may comprise LIDAR sensors, optical sensors, or a combination thereof. Operations that an autonomous vehicle may perform while being operated in autonomous driving mode may include, but are not limited to, driving in accordance with posted speed limit signs, obeying traffic signals, stopping at stop signs, going through automatic toll booths, or driving conservatively on sparsely populated surface streets to avoid collisions.

The method 300 may optionally proceed to step 303. In step 303, a control system determines instructions for pairing the autonomous vehicle with a guide vehicle. The guide vehicle may be a manually driven vehicle capable of guiding the autonomous vehicle along surface streets, such as guide vehicle 104 discussed above with reference to FIG. 1. The instructions can include identification information for the autonomous vehicle and/or the guide vehicle, estimated times of arrival, a rendezvous location, a loiter location, one or more backup pairing locations, or a combination thereof.

The method 300 may optionally proceed to steps 304*a* and 304*b*. In step 304*a*, the control system transmits instructions for pairing with the guide vehicle to the autonomous vehicle. In step 304*b*, the control system transmits instructions for pairing with the autonomous vehicle to the guide vehicle. In some embodiments, steps 304*a* and 304*b* may occur simultaneously. In some embodiments, step 304*a* and

304*b* may occur consecutively. The instructions transmitted to the autonomous vehicle and the guide vehicle may include the instructions determined by the control system in step 303 or a subset thereof.

The method 300 may then proceed to step 306. In step 306, the autonomous vehicle detects a visual fiducial associated with the guide vehicle. In some embodiments, the visual fiducial may be an ArUco, QR code, barcode, bit code, or any other unique visible fiducial. The visual fiducial may be fixed to the exterior or a clearly visible portion of the interior of the dispatched guide vehicle. The visual fiducial may be provided on a fixed display mounted to the guide vehicle, may be painted onto the guide vehicle, and/or may be rendered on a dynamic display mounted to the guide vehicle. The autonomous vehicle may detect the visual fiducial using one or more optical sensors. In some embodiments, the optical sensors may be the same sensors used to detect road and environmental conditions when the autonomous vehicle is operated in autonomous driving mode.

After the autonomous vehicle detects the visual fiducial associated with the guide vehicle, the method 300 may optionally proceed to step 308. In step 308, the autonomous vehicle and the guide vehicle establish a communicative link with one another, based at least in part on detection of the visual fiducial. In some embodiments, the communicative link may be a peer-to-peer network, a mesh network, satellite communications network, or any other suitable wireless network communication arrangement. The one or more wireless communicative links may include a cellular connection, a Bluetooth connection, or one or more other wireless communication protocols. In some embodiments, multiple (e.g., redundant) wireless communicative links may be simultaneously established between the autonomous vehicle and the guide vehicle. In some embodiments, once the communicative link is established, the autonomous vehicle may be able to detect one or more behaviors of the guide vehicle through the communicative link.

The method 300 can continue with step 310. In step 310, the autonomous vehicle operates in semi-autonomous follower mode. An operation in semi-autonomous follower mode may comprise performing one or more driving operations based on road and environmental conditions detected by the one or more sensors of the autonomous vehicle and one or more behaviors of the guide vehicle. In some embodiments, the one or more behaviors of the guide vehicle may be detected by the one or more sensors of the autonomous vehicle. In some embodiments, the one or more behaviors of the guide vehicle may be obtained from the communicative link between the autonomous vehicle and the guide vehicle. Operations that an autonomous vehicle may perform while being operated in semi-autonomous follower mode may include, but are not limited to, navigating construction zones on surface streets, navigating densely populated surface streets, navigating accident zones, driving through manual toll booths, and driving through difficult weather conditions such as snow, heavy dust, or heavy rain. In some embodiments, the autonomous vehicle may continue operating in semi-autonomous follower mode until reaching a pre-determined destination, such as destination 116 as described above with reference to FIG. 1.

Optionally, the method 300 may proceed to step 312. In step 312, the autonomous vehicle detects a failure condition while operating in semi-autonomous follower mode. Failure conditions can include any conditions impacting the ability of the autonomous vehicle to follow the guide vehicle in semi-autonomous follower mode. For example, the autonomous vehicle may lose communication with and lose sight of the guide vehicle. In another example, the guide vehicle may make a maneuver that the autonomous vehicle cannot follow. The guide vehicle may also be apprehended by law enforcement or be involved in a road accident during guide operations. Additionally, the autonomous vehicle may have difficulty consistently following the guide vehicle despite being paired (e.g., the guide vehicle may not be detected where it is expected to be seen based on information communicated via the cloud, or environmental conditions may impair the autonomous vehicle's ability to follow the guide vehicle). Failure conditions can also include failures of the autonomous vehicle itself. For example, the autonomous vehicle may experience a mechanical failure.

After the autonomous vehicle detects a failure condition, the method 300 may optionally proceed to step 314. In step 314, the autonomous vehicle transmits a signal to the control system indicating that the failure condition has occurred. The signal may indicate the nature of the failure condition experienced so that the control system can determine an appropriate response.

After the autonomous vehicle transmits a signal to the control system indicating that the failure condition has occurred, the method 300 may optionally proceed to step 316. In step 316, the autonomous vehicle receives a signal from the control system indicating a safe stop location. The safe stop location may be a side of the highway, a highway exit, a rest stop, a parking lot, a surface street, or any other accessible location that is safe for the autonomous vehicle to stop. In some embodiments, one or more safe stop locations are pre-determined by the control system prior to the trip, such that in the event of a failure condition, the control system can direct the autonomous vehicle to the closest and/or most easily accessible safe stop location along the route.

The method 300 may optionally proceed to step 318. In step 318, the autonomous vehicle responsively travels to the safe stop location in autonomous driving mode. The safe stop location indicated by the control system may be a location that can be reached by the autonomous vehicle using only operations that can be performed in autonomous driving mode. For instance, the safe stop location may be accessible via a route that does not include any densely populated surface streets, manual toll booths, construction zones, or accident zones.

After the autonomous vehicle responsively travels to the safe stop location, the method 300 may optionally proceed to one of steps 320, 326, or 332. In steps 320-324, the guide vehicle may travel to the safe stop location to pair with the autonomous vehicle again. Steps 320-324 may be performed in lieu of steps 326-330 and steps 332-334. In steps 326-330, a replacement guide vehicle may travel to the safe stop location to pair with the autonomous vehicle. Steps 326-330 may be performed in lieu of steps 320-324 and steps 332-334. In steps 332-334, a human driver may travel to the safe stop location and operate the autonomous vehicle in manual mode. Steps 332-334 may be performed in lieu of steps 320-324 and steps 326-330.

In some embodiments, the method 300 may proceed to step 320. In step 320, the autonomous vehicle receives an instruction from the control system to wait for the guide vehicle to arrive at the safe stop location. In some embodiments, the instruction may include additional information, such as the current location of the guide vehicle or an estimated time of arrival of the guide vehicle.

The method 300 may then proceed to step 322. In step 322, the autonomous vehicle detects the visual fiducial associated with the guide vehicle. Detecting the visual fiducial may cause the autonomous vehicle to re-establish a connection with the guide vehicle based on the visual fiducial. The autonomous vehicle may also re-establish one or more redundant communicative links with the guide vehicle (e.g., a cellular connection, a Bluetooth connection, or any other direct wireless communication protocol).

After the autonomous vehicle detects the visual fiducial associated with the guide vehicle, the method 300 may proceed to step 324. In step 324, the autonomous vehicle resumes operation in semi-autonomous follower mode. In some embodiments, the autonomous vehicle may follow the guide vehicle to a pre-determined destination. The destination may include a drop-off location for cargo (e.g., consumer goods, equipment, commodities, livestock, etc.) transported by the autonomous vehicle such as a warehouse, a shipping facility, a store, or any other suitable destination for the cargo.

In some embodiments, the method 300 may proceed directly from step 318 to step 326. Steps 326-330 may be performed in lieu of steps 320-324 and steps 332-334. In step 326, the autonomous vehicle receives an instruction from the control system to wait for a replacement guide vehicle to arrive at the safe stop location. In some embodiments, the instruction may include additional information, such as one or more identifiers corresponding to the replacement guide vehicle, the current location of the replacement guide vehicle, or an estimated time of arrival of the replacement guide vehicle. The replacement guide vehicle may be a car or truck operated by a human driver that can lead the autonomous vehicle when the autonomous vehicle is operated in semi-autonomous follower mode. A visual fiducial such as a QR code, ArUco, barcode, bit code, or other unique visual fiducial may be associated with the replacement guide vehicle. The visual fiducial may be attached to the exterior or interior of the replacement guide vehicle such that the visual fiducial is visible by the one or more sensors of the autonomous vehicle. The visual fiducial may be provided on a fixed display mounted to the replacement guide vehicle, may be painted onto the replacement guide vehicle, and/or may be rendered on a dynamic display mounted to the replacement guide vehicle.

In some embodiments, the method 300 may proceed to step 328. In step 328, the autonomous vehicle detects the visual fiducial associated with the replacement guide vehicle. Detecting the visual fiducial may cause the autonomous vehicle to establish a connection with the replacement guide vehicle based on the visual fiducial. The autonomous vehicle may also establish one or more redundant communicative links with the replacement guide vehicle (e.g., a cellular connection, a Bluetooth connection, or any other direct wireless communication protocol).

After the autonomous vehicle detects the visual fiducial associated with the replacement guide vehicle, the method 300 may proceed to step 330. In step 330, the autonomous vehicle resumes operation in semi-autonomous follower mode. In some embodiments, the autonomous vehicle may follow the replacement guide vehicle to a pre-determined destination.

In some embodiments, the method 300 may proceed directly from step 318 to step 332. Steps 332-334 may be performed in lieu of steps 320-324 and steps 326-330. In step 332, the autonomous vehicle receives an instruction from the control system to wait for a human driver to arrive at the safe stop location. The human driver may be the driver of the guide vehicle or a different driver (e.g., a new driver dispatched by the control system). In some embodiments, the instruction may include additional information, such as the current location of the human driver, an estimated time of arrival of the human driver, or other information about the human driver (e.g., how the human driver is being transported to the safe stop location, an identity of the human driver, etc.).

The method 300 may proceed to step 334. In step 334, the autonomous vehicle operates in manual mode. Once the human driver arrives at the safe stop location, the human driver may enter the autonomous vehicle and operate the autonomous vehicle in manual mode, wherein an operation in manual mode comprises one or more driving operations executed by the human driver. In some embodiments, operating the autonomous vehicle in manual mode may include turning off or temporarily disabling the autonomous driving capabilities of the autonomous vehicle. In some embodiments, the human driver may drive the autonomous vehicle to a pre-determined destination.

Figure 4:
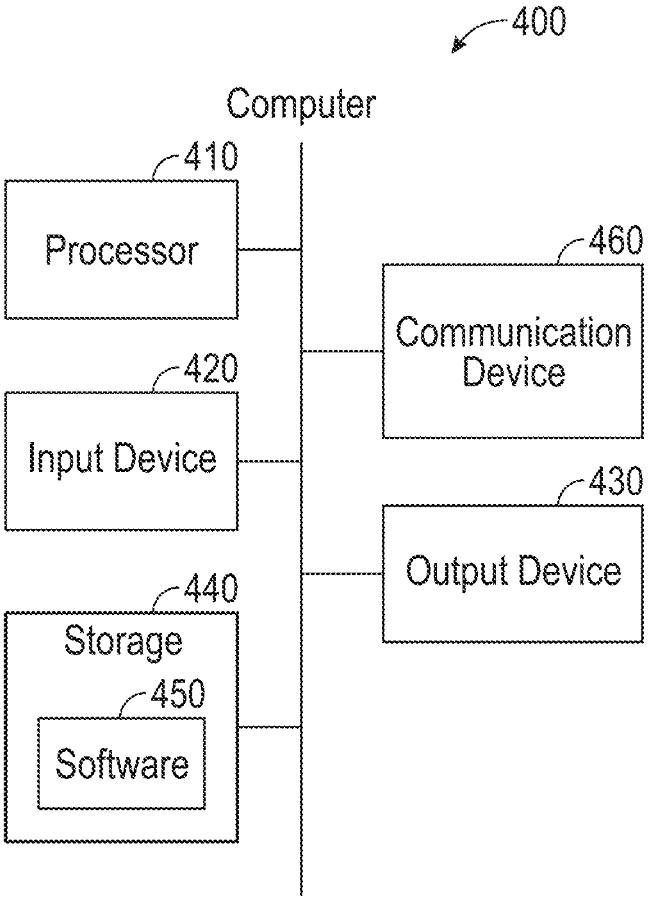
FIG. 4 illustrates an exemplary computing system, according to some embodiments.

In one or more examples, the disclosed systems and methods utilize or may include a computer system. FIG. 4 illustrates an exemplary computing system according to one or more examples of the disclosure. Computer 400 can be a host computer connected to a network. Computer 400 can be a client computer or a server. As shown in FIG. 4, computer 400 can be any suitable type of microprocessor-based device, such as a personal computer, workstation, server, or handheld computing device, such as a phone or tablet. The computer can include, for example, one or more of processor 410, input device 420, output device 430, storage 440, and communication device 460. Input device 420 and output device 430 can correspond to those described above and can either be connectable or integrated with the computer.

Input device 420 can be any suitable device that provides input, such as a touch screen or monitor, keyboard, mouse, or voice-recognition device. Output device 430 can be any suitable device that provides an output, such as a touch screen, monitor, printer, disk drive, or speaker.

Storage 440 can be any suitable device that provides storage, such as an electrical, magnetic, or optical memory, including a random-access memory (RAM), cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein.

Software 450, which can be stored in storage 440 and executed by processor 410, can include, for example, the programming that embodies the functionality of the present disclosure (e.g., as embodied in the systems, computers, servers, and/or devices as described above). In one or more examples, software 450 can include a combination of servers such as application servers and database servers.

Software 450 can also be stored and/or transported within any computer-readable storage medium for use by or in connection with an instruction execution system, apparatus, or device, such as those detailed above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments and/or examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. An autonomous cargo truck comprising:
- one or more sensors;
- one or more processors; and
- one or more computer readable media storing instructions that, when executed by the tone or more processors, cause the autonomous cargo truck to:
  - operate in an autonomous non-following mode, wherein an operation in the autonomous non-following mode comprises performing one or more driving operations based on road and environmental conditions detected by the one or more sensors;
  - detect, by the one or more sensors, a first visual fiducial associated with a guide vehicle;
  - in response to detecting the first visual fiducial associated with the guide vehicle, operate in a semi-autonomous follower mode, wherein an operation in the semi-autonomous follower mode comprises performing one or more driving operations based on road and environmental conditions detected by the one or more sensors and one or more behaviors of the guide vehicle;
  - after detecting the first visual fiducial associated with the guide vehicle, track, using the one or more sensors, the guide vehicle based on the first visual fiducial while the autonomous cargo truck operates in the semi-autonomous follower mode; and
  - in response to the one or more sensors failing to detect the first visual fiducial, operate in the autonomous non-following mode.

2. The autonomous cargo truck of claim 1, wherein the first visual fiducial is an ArUco, QR code, barcode, or bit code.

3. The autonomous cargo truck of claim 1, wherein the instructions, when executed by the one or more processors, cause the autonomous cargo truck to:
- establish a communicative link with the guide vehicle based on the first visual fiducial.

4. The autonomous cargo truck of claim 3, wherein the communicative link is a peer-to-peer link.

5. The autonomous cargo truck of claim 3, wherein the communicative link is a cellular connection, a Bluetooth connection, or a direct wireless communication protocol.

6. The autonomous cargo truck of claim 1, wherein the one or more behaviors of the guide vehicle are detected by the one or more sensors.

7. The autonomous cargo truck of claim 3, wherein the one or more behaviors of the guide vehicle are obtained through the communicative link.

8. The autonomous cargo truck of claim 3, wherein the instructions, when executed by the one or more processors, cause the autonomous cargo truck to:
- determine whether a failure condition has occurred;
- based on a determination that the failure condition has occurred,
  - provide a first signal to a control system indicating that the failure condition has occurred;
  - receive a second signal from the control system indicating a safe stop location; and
  - responsively travel to the safe stop location in the autonomous non-following mode.

9. The autonomous cargo truck of claim 8, wherein the instructions, when executed by the one or more processors, cause the autonomous cargo truck to:
- receive a third signal from the control system instructing the autonomous cargo truck to wait for the guide vehicle to arrive at the safe stop location;
- after the guide vehicle arrives at the safe stop location, detect the first visual fiducial; and
- responsively resume operating in the semi-autonomous follower mode.

10. The autonomous cargo truck of claim 8, wherein the instructions, when executed by the one or more processors, cause the autonomous cargo truck to:
- receive a third signal from the control system instructing the autonomous cargo truck to wait for a replacement guide vehicle to arrive at the safe stop location;
- after the replacement guide vehicle arrives at the safe stop location, detect a second visual fiducial; and
- responsively resume operating in the semi-autonomous follower mode.

11. The autonomous cargo truck of claim 8, wherein the instructions, when executed by the one or more processors, cause the autonomous cargo truck to:
- receive a third signal from the control system instructing the autonomous cargo truck to wait for a human driver to arrive at the safe stop location; and
- after the human driver arrives at the safe stop location, operate in a manual mode, wherein an operation in the manual mode comprises one or more driving operations executed by the human driver.

12. The autonomous cargo truck of claim 8, wherein determining whether a failure condition has occurred comprises determining that the communicative link was lost and the one or more sensors do not detect the guide vehicle.

13. The autonomous cargo truck of claim 8, wherein determining whether a failure condition has occurred comprises determining that the guide vehicle made a maneuver that the autonomous cargo truck cannot follow.

14. The autonomous cargo truck of claim 8, wherein determining whether a failure condition has occurred comprises determining that the guide vehicle was apprehended by law enforcement.

15. The autonomous cargo truck of claim 8, wherein determining whether a failure condition has occurred comprises determining that the guide vehicle was in a road accident.

16. A method for controlling an autonomous cargo truck, the method performed at an autonomous cargo truck comprising one or more sensors, one or more processors, and one or more computer readable media storing instructions, the method comprising:

operating in an autonomous non-following mode, wherein an operation in the autonomous non-following mode comprises performing one or more driving operations based on road and environmental conditions detected by the one or more sensors;

detecting, by the one or more sensors, a first visual fiducial associated with a guide vehicle;

in response to detecting the first visual fiducial associated with the guide vehicle, operating in a semi-autonomous follower mode, wherein an operation in the semi-autonomous follower mode comprises performing one or more driving operations based on road and environmental conditions detected by the one or more sensors and one or more behaviors of the guide vehicle;

after detecting the first visual fiducial associated with the guide vehicle, track, using the one or more sensors, the guide vehicle based on the first visual fiducial while the autonomous cargo truck operates in the semi-autonomous follower mode; and in response to the one or more sensors failing to detect the first visual fiducial, operate in the autonomous non-following mode.

17. A non-transitory computer-readable storage medium storing instructions for controlling an autonomous cargo truck comprising one or more sensors and one or more processors, wherein the instructions, when executed by the one or more processors, cause the autonomous cargo truck to:

operate in an autonomous non-following mode, wherein an operation in the autonomous non-following mode comprises performing one or more driving operations based on road and environmental conditions detected by the one or more sensors;

detect, by the one or more sensors, a first visual fiducial associated with a guide vehicle;

in response to detecting the first visual fiducial associated with the guide vehicle, operate in a semi-autonomous follower mode, wherein an operation in the semi-autonomous follower mode comprises performing one or more driving operations based on road and environmental conditions detected by the one or more sensors and one or more behaviors of the guide vehicle;

after detecting the first visual fiducial associated with the guide vehicle, track, using the one or more sensors, the guide vehicle based on the first visual fiducial while the autonomous cargo truck operates in the semi-autonomous follower mode; and in response to the one or more sensors failing to detect the first visual fiducial, operate in the autonomous non-following mode.

* * * * *